INVENTOR.
ARCHIBALD D. EVANS
*Hamilton, Cook,*
*Renner*
*Kenner*
ATTORNEYS

Nov. 21, 1972   A. D. EVANS   3,703,443
SOLAR STILL

Filed Oct. 19, 1970   2 Sheets-Sheet 2

INVENTOR.
ARCHIBALD D. EVANS
BY Hamilton, Cook.
Renner & Renner
ATTORNEYS

United States Patent Office 3,703,443
Patented Nov. 21, 1972

3,703,443
SOLAR STILL
Archibald D. Evans, 21039 Bryant,
Canoga Park, Calif. 91304
Filed Oct. 19, 1970, Ser. No. 81,747
Int. Cl. B01d 3/00
U.S. Cl. 202—190
6 Claims

ABSTRACT OF THE DISCLOSURE

A solar still. A membrane is carried on a base frame which floats in the liquid environment from which a distillate is to be extracted. The membrane extends as a dome-like, hemispherical roof above the base frame and also contacts the surface of the liquid environment circumferentially of the base frame to encapsulate an air cell within the still. In addition, the membrane is at least partially transparent to permit access of solar energy to the upwardly directed surface of a converted means by which the solar energy produces heat. The converter means is located within the still and supported by the base frame so that at least a portion of the upwardly directed surface on the converter means lies awash of the liquid in which the base frame is floatingly supported in order to facilitate vaporization of the liquid by the heat emitted from the converter means. Although the encapsulated air cell within the still is effectively sealed from the surrounding atmosphere so that the distillate will condense on the interior surface of the membrane, the arrangement of the converter means within the base frame permits continuous access to the converter means by the liquid environment in which the still operates. The upper surface of the converter means is inclined so that the exiting flow of residual liquid and the feeding flow of replenishing liquid induced by their relative specific gravities is augmented to effect a self-cleaning of the converter means. The thermal convection currents within the air cell as well as the action of the wind and waves on the membrane cause the droplets of condensed distillate to flow outwardly and downwardly along the interior surface of the membrane and accumulate within an involute formed by that portion of the membrane which contacts the liquid environment. Also disclosed are means to inflate the membrane and means to remove the distillate.

BACKGROUND OF THE INVENTION

The present invention relates to a solar still. The utilization of stills that employ solar energy to extract potable water from a source of water that is undrinkable because of mineral content or other contamination has long been known. These prior art stills also employ some means to receive solar radiation and convert it to heat by which vaporization is induced.

According to prior art concepts the means by which the conversion of solar energy to heat energy is effected have been quite uniformly either incorporated in, or positioned in operative relationship with, a container that holds a predetermined amount of the liquid from which the distillate is to be derived. Such containers have been fabricated in widely diverse modifications which may subgenerically be classified as bags, trays or pads, but whatever their form, the residual material remaining therein after evaporation of the distillate sought contains a high concentration of the contaminate which eventually forms an encrustation on at least the container and very often on the means by which the solar energy is converted to heat. For example, when a solar still is used to desalinate sea water, the concentration of brine in the residual liquid results in the solidification of considerable residue on those parts in contact with the residual liquid. Such deposits not only tend to foul, or plug, the container but may also greatly reduce the efficiency of the still. In either situation, the still must be periodically cleaned and the encrusted components must often be replaced after an inefficiently short period of time.

By and large, these prior art containers are of limited size so that they must be constantly refilled. Although elaborate automatic pump control systems have been employed to maintain continuous operation of some prior art stills, such systems tend to be complicated, expensive and require periodical maintenance. Furthermore, the problem of residue buildup remains.

SUMMARY OF THE INVENTION

It is, therefore, a primary object of the present invention to provide an efficient solar still that operates substantially continuously without supervision, without prior site preparation and without fouling.

It is another object of the present invention to provide a solar still, as above, that is relatively uncomplicated and which can be inexpensively manufactured and maintained.

These and other objects, together with the advantages thereof over existing and prior art forms which will become apparent from the following specification, are accomplished by means hereinafter described and claimed.

In general, a solar still embodying the concept of the present invention has a base frame adapted to float in a liquid environment. A converter means having an upwardly directed surface by which solar energy is transformed into heat is supported by the base frame so that the said upwardly directed surface lies at least partially awash in the liquid on which the base frame floats. Passage means are provided to assure that replenishing liquid will have constant access to the upwardly directed surface on the converter means and also to assure that the residual liquid may flow away therefrom. Because the upwardly directed surface of the converter means is inclined, the feeding flow of replenishing liquid and the exiting flow of residual liquid—self-induced by their relative specific gravities—is augmented such that the exiting flow of the residual liquid across the inclined surface of the converter means tends to obviate encrustation and clean that surface.

A flexible membrane that is inflatable into a generally hemispherical dome is attached to the base frame. At least a portion of this membrane is transparent to permit access of solar energy to the upwardly directed surface of the converter means whereby the liquid lying awash thereof may be vaporized. Along the perimeter of the dome formed thereby the membrane is sealed to the surface of the liquid in which the base frame floats to encapsulate an air cell therein.

As vaporization takes place, a dynamic atmosphere is created within the air cell that is independent of the surrounding atmosphere. The atmosphere of the air cell is warmed by the heated vapor, and the resulting convection currents cause the vapor to flow along the entire inner surface of the dome-like membrane. When the dew point of the atmosphere within the air cell rises above the ambient temperature, the distillate condenses on the inner surface of the membrane.

The vapor that condenses on the membrane is then caused to flow along the membrane and is accumulated in an annular involute at the lower periphery of the dome-like membrane.

One preferred, and one alternative, embodiment of the present invention are shown by way of example in the accompanying drawings and are described in detail without attempting to show all of the various forms and modifications in which the invention might be embodied; the invention being measured by the appended claims and not by the details of the specification.

DESCRIPTION OF THE PREFERRED EMBODIMENT

Figure 1:
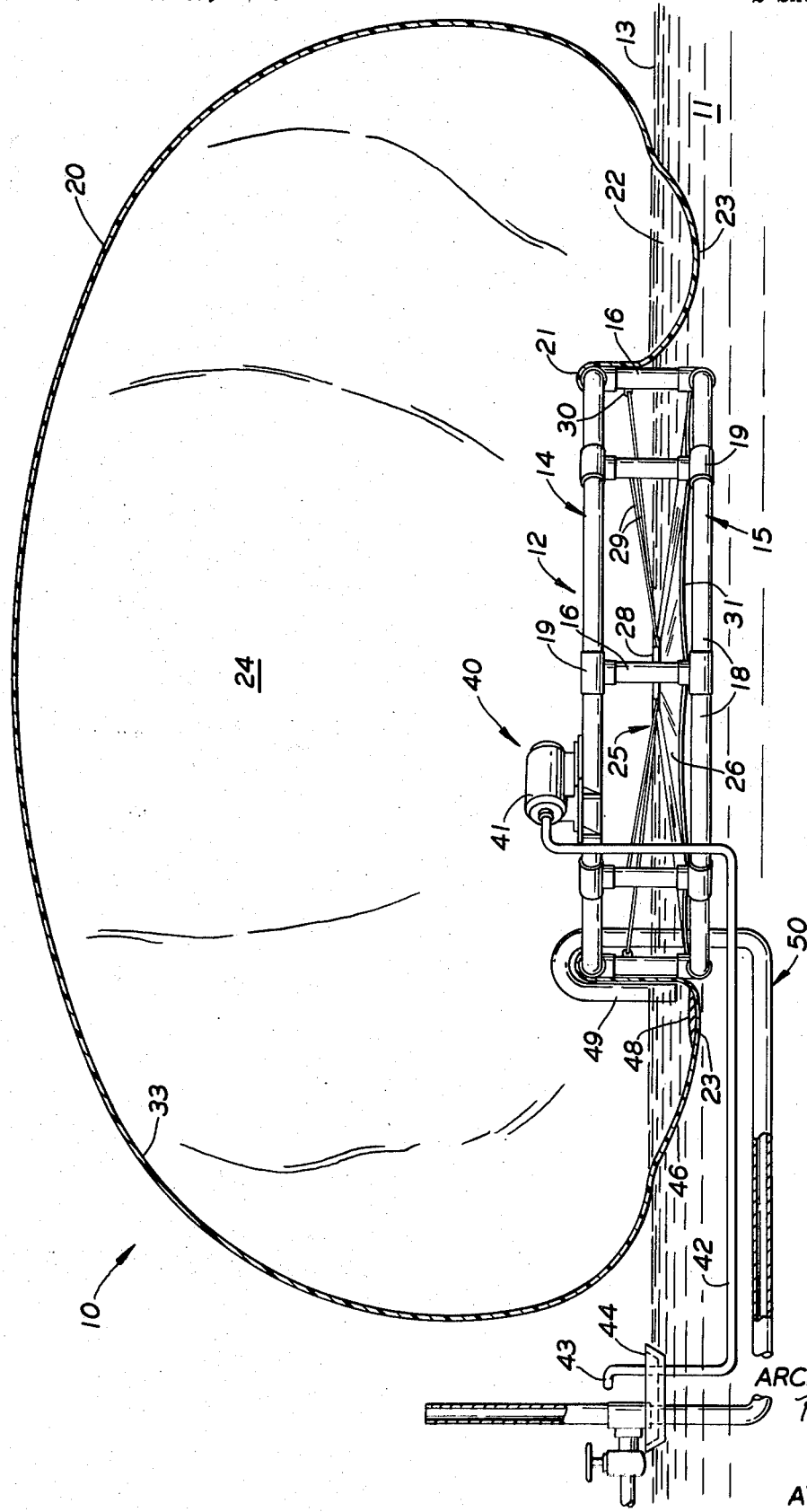
FIG. 1 is a vertical section through the dome-like membrane of a solar still embodying the concept of the present invention depicting the base frame in elevation.
Figure 2:
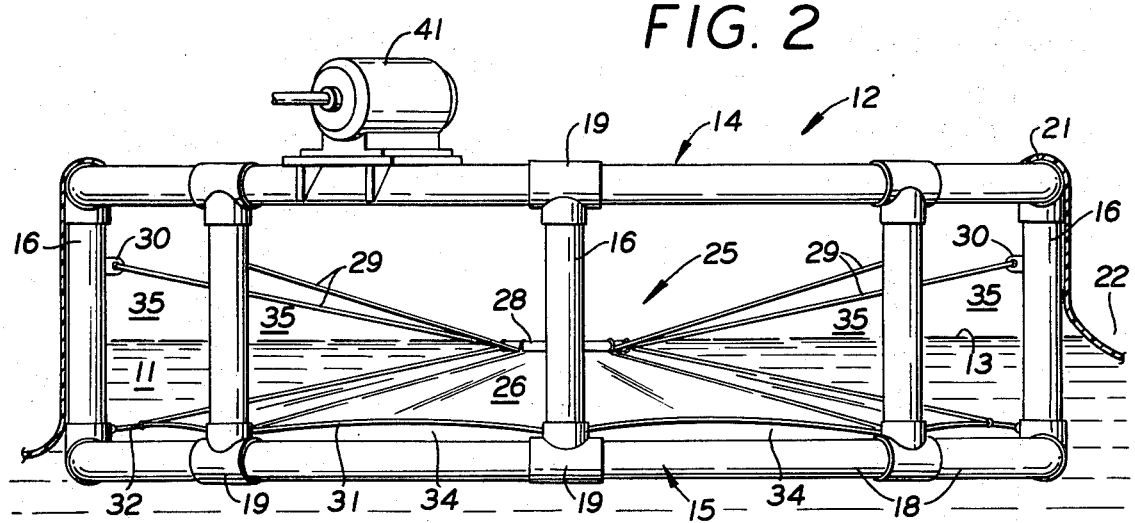
FIG. 2 is an enlarged area of FIG. 1 depicting the interrelation of the converter means, the base frame and the liquid environment.

Referring more particularly to the drawings, one preferred embodiment of a solar still incorporating the concept of the present invention is designated generally by the numeral 10. The still 10 is depicted floating in operative position within a liquid environment 11 such as an ocean, lake, or the like, where it will recover fresh, potable water by the process of distillation.

The still 10 has a base frame 12 provided with flotation means by which the entire still may be suspended substantially on the surface 13 of the liquid environment 11. Although the flotation means may well be one or more separate members secured to the base frame, it is equally feasible that the base frame 12 be constructed to incorporate a flotation means therein.

In addition, it is generally desirable for the base frame 12 to be capable of resisting the corrosive action of the liquid environment on which the still operates. Here, too, the base frame may be provided with a protective coating, but it is equally feasible to construct the base frame of a material that is itself corrosion resistant.

Flotation and anticorrosion can often both be achieved by constructing the base frame 12 out of a plastic such as ABS (acrylonitrile-butadiene styrene terpolymer). As shown, the base frame 12 may have upper and lower rail portions 14 and 15, respectively, joined in vertically spaced relation by a plurality of post members 16. The rail portions 14 and 15 are each constructed with short lengths of piping 18 joined to each other and to the post members 16 by a plurality of tees 19. These several individual components can be cemented together to form a hollow base frame that will float and also resist the corrosive effects of a typical environment on which such a still might be expected to be used. Naturally, for specific environments some particular condition might be encountered for which special provision would be required.

When the still 10 is operative, a flexible membrane 20 is carried by the base frame 12 and inflated to a generally hemispherical, dome-like roof. The membrane 20 must readily admit, or transmit, solar radiation and yet be air and liquid impervious. For such a purpose, vinyl sheet material—such as polyvinyl fluoride—works quite well.

In order to achieve the desired dome-like configuration of the membrane 20 with vinyl, a series of vinyl sheets may be cut and joined, as by thermoplastic welding, so that when inflated the membrane will extend peripherally beyond the base frame 12 with the marginal edge 21 rolled inwardly and upwardly to define an involute 22 extending annularly about the base frame 12. The peripheral edge 21 of membrane 20 must be secured to the base frame 12 upwardly of the liquid surface 13 so that the liquid 11 in which the still is suspended cannot accidentally slosh into the involute 22. As shown, the marginal edge 21 may well be secured to the upper rail portion 14 of the base frame 12.

The downwardly directed surface 23 on the involute 22 may contact the upper surface 13 of the liquid 11 to seal the air cell 24 within the still from the surrounding atmosphere. As such, the air pressure required to inflate the membrane 20 and the vapor formed by the distillation process will be retained within the air cell 24.

A converter means 25 is circumscribed and supported by the base frame 12 so that the upwardly directed surface 26 thereof lies at least partially awash in the environmental liquid 11 on which the base frame 12 is floatingly suspended. A substantial portion of surface 26, lying awash is inclined for a purpose more fully hereinafter explained. The surface 26 is opaque and a dark color, preferably black, in order to convert the solar radiation which penetrates the dome-like membrane 20 and strikes surface 26 into heat energy that vaporizes a portion of the liquid which overlies the converter means 25. To provide the desired coloration of surface 26 the converter means 25 may well be a carbon pigmented plastic sheet.

When using such a sheet the medial portion 28 thereof may be supported by a plurality of cables 29 passing between the medial portion 28 and anchor tabs 30 located on the post members 16 of the base frame at an elevation preferably upwardly of the buoyancy line—i.e., the level at which the surface 13 intersects the post member 16 when the still 10 is floatingly supported on liquid 11. The perimeter 31 of the sheet which constitutes the converter means 25 may then be secured, as by a plurality of cables 32, to the base frame 12 at points lower than the buoyancy line in order to provide the required inclination of the surface 26 and at the same time assure that a portion of the surface 26 lies awash by liquid 11. As shown, the cables 32 may well be secured to the lower rail portion 15.

As the heat converted from the solar energy vaporizes the water from the liquid 11 overlying the converter means 25, the natural dynamics of the thermal convection currents within the air cell 24 circulate the vapor and bring it into contact with the membrane 20. As the air cell warms and the quantity of vapor therein increases, the temperature of the membrane itself is influenced by the temperature of the ambient atmosphere in contact therewith which tends to maintain the membrane itself at a temperature lower than that of the air cell until the dew point within the air cell rises above the temperature of the membrane. Under that condition droplets of the distillate will form on the inwardly directed surface 33 of the membrane 20. The action of any waves in the liquid environment on the entire still 10 and the action of any wind on the membrane 20 agitate and flex the membrane to induce the drops of distillate formed on the inwardly directed surface 33 thereof to flow outwardly and downwardly therealong and into the involute 22. This flow of the droplets is further induced by the scrubbing action of the convection current flow pattern of the vapor within the air cell 24.

It should be appreciated that the droplets which form on the inner surface 33 tend to screen the flow of solar energy through the membrane 20 and "shadow" the converter means 25 so that it is highly desirable to assure that the distillate will flow off the membrane and accumulate within the involute 22 as quickly as possible. The degree of inflation (thereby to provide sufficient flexibility to the membrane) in conjunction with a suitable selection of the height-to-width ratio for the dome-like configuration (thereby to augment both the scrubbing action of the convection currents within the air cell and the natural gravitational flow) obviates the necessity of treating the inwardly directed surface 33 with a wetting agent, or the like.

As the water vaporizes from the liquid overlying the converter means 25, a localized increase in the specific gravity will occur in the residual liquid. The heavier residual liquid will then settle and thereby flow along the inclined upwardly directed surface 26 of the converter means 25. In addition, because the lowermost portion of the surface 26—i.e., the perimeter 31 thereof—communicates directly with the environmental liquid 11 in which the still 10 is suspended, the exiting flow of residual liquid along the converter means 25 will flush the upwardly directed surface 26 to remove any deposit thereon and replenishing liquid will be admitted to replace residual liquid as it leaves the still.

The admitting and existing flows of liquid is preferably unobstructed for the most efficient self-cleaning operation of the subject still, and suitable passage means must be provided to assure this result. In the embodiment depicted, the plurality of gaps 34 between the lower rail 15 and the perimeter 31 of converter means 25 together with the openings 35 in the latticed arrangement of the rail means and post members 14, 15 and 16, respectively, comprise the passage means which permit the free exchange of liquid required by the subject still 10.

It must be appreciated that the required free exchange of liquid to the conveyor means 25 is wholly compatible with the requirements to maintain the air cell 24 sealed from the surrounding atmosphere inasmuch as the engagement of the lowermost surface 23 along the full annular extent of the involute 22 with the surface 13 of liquid 11 to seal the air cell 24 does not affect the liquid flow to the converter means 25.

Although given sufficient time the cell will tend to self inflate, the efficiency of the still is so far reduced prior inflation that is is highly advisable to provide an auxiliary means to inflate the membrane.

FIG. 1 discloses one construction by which this result can be achieved. An inflation means 40 such as compressor 41 pumps air into the still 10 through feed line 42, the intake end 43 of which may be supported exteriorly of the still 10 by a float means 44. The compressor 41 may be battery operated, or even powered by solar energy, and may, furthermore, be selectively operated by a pressure responsive switch means (not shown) to maintain the membrane 20 in its most efficient configuration. The construction depicted works quite well for stills of relatively modest size—say up to approximately 25 feet.

Figure 3:
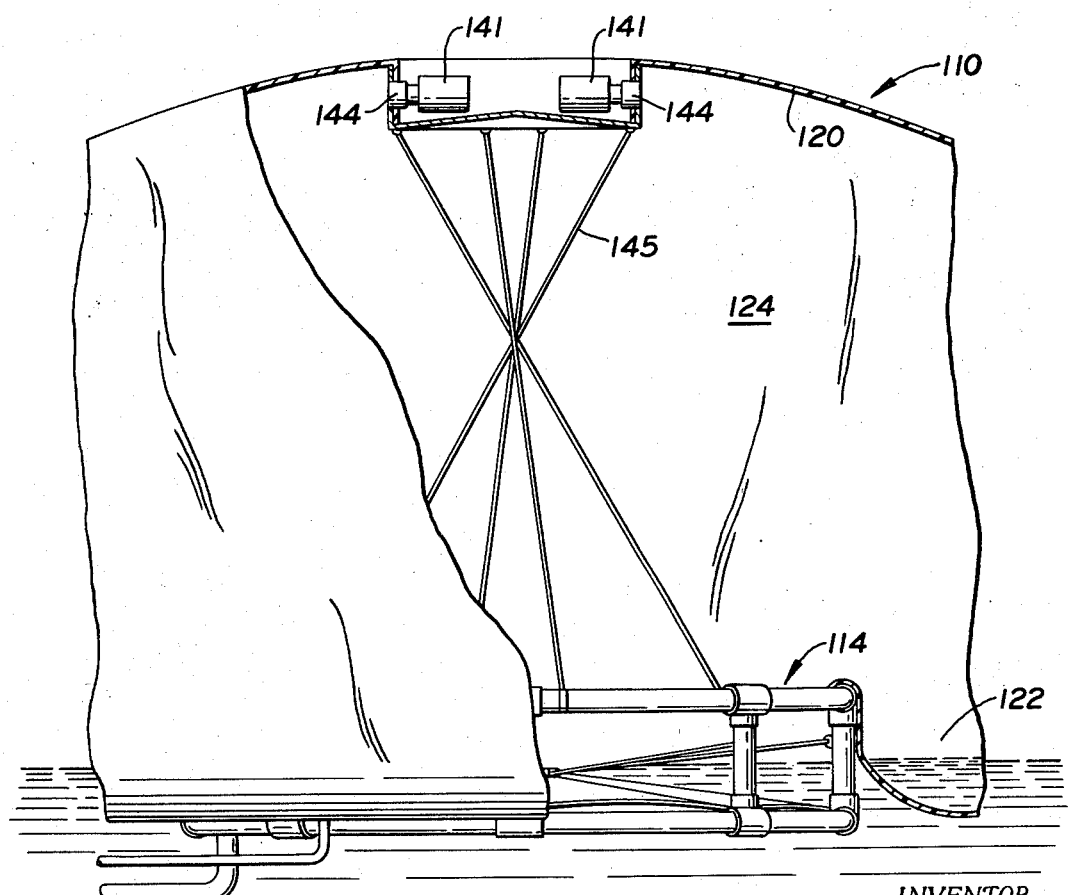
FIG. 3 is a partial side elevation, partly broken away, of an alternative embodiment of a solar still incorporating the concept of the present invention.

However, for stills of even larger size, such as still 110 depicted in FIG. 3, it may well be desirable to mount one or more compressors 141 directly on the membrane 120. This construction eliminates the necessity of a long feed line 42 inasmuch as the air may then be pumped into the air cell 124 through a check valve 144 that opens through the membrane 120. With such an embodiment it is often desirable to use restricting means, such as cables 145 extending between the top rail 114 and the membrane 120, not only to stabilize the membrane but also to assure that the dome-like configuration will conform to the desired aspect ratio.

To facilitate removal of the distillate accumulated in the involute 22, or 122, a sump portion 46 may be provided in the involute. The sump may be formed by positioning ballast 48 at a specific location within the involute or by fabricating the membrane such as to present a depressed well, not shown, into either of which the intake line 49 of the discharge device 50 may communicate. The discharge device may comprise a siphon arrangement or may include a pump (not shown), but in either event it should be remembered that neither the inflation means nor the discharge device must permit sufficient escape of the inflating air to collapse the membrane 20.

Although the involute 22, or 122, provides a reservoir for storing the distillate, retention of an undue volume of the distillate within the still has a self-limiting effect on the still primarily because the aspect ratio of the dome-like configuration presented by the membrane alters in response to a volumetric increase of the liquid within the involute. In addition, the desired flexibility of the membrane is greatly reduced as the contraction of the air cell occasioned by an increase in the volume of liquid retained within the involute raises the atmospheric pressure within the air cell. As such, the most efficient extended operation would be achieved by tending to match the rate of withdrawal with the rate at which the distillate is produced.

Although the capacity of such a still is ultimately controlled by the solar energy available, in addition to the amount of solar energy available the capacity of such a still has been found to vary by the cube in response to a variation of the area of a properly oriented, upwardly directed surface on the converter means by the square. For this optimum operation to obtain, of course, the volume of the air cell and the aspect ratio of the dome-like member must be compatible with the quantity of the vapor to be produced.

A solar still embodying the concept of the present invention may well be anchored off shore on an ocean, placed in a swamp or situated on a polluted lake or pond to operate substantially continuously without requiring supervision or becoming fouled and otherwise to accomplish the objects of the invention.

I claim:

1. A solar still comprising, a base frame, flotation means for supporting said base frame in a liquid environment, converter means supported by said base frame, a membrane carried by said base frame and positioned above said converter means, at least a portion of said membrane being transparent to permit access of solar radiation to said converter means, said converter means presenting an upwardly directed surface that lies at least partially awash in the liquid on which said base frame is suspended, said upwardly directed surface being inclined, said inclined, upwardly directed surface being darkly opaque to convert the solar radiation which penetrates said membrane into heat energy to vaporize a portion of the liquid which overlies said upwardly directed surface, at least the lowermost portion of said inclined, upwardly directed surface communicating directly with the liquid on which said base frame is suspended to admit replenishing liquid and accommodate the exiting flow of residual liquid as it flushes along said upwardly directed surface to remove deposits, and means for accumulating the distillate condensing on said membrane.

2. A solar still, as set forth in claim 1, in which the medial portion of said upwardly directed surface is disposed generally horizontally with respect to the suspended orientation of said base frame in its liquid environment, surrounding said medial portion the said upwardly directed surface of said converter means tapers downwardly and outwardly therefrom.

3. A solar still, as set forth in claim 1, in which said base frame has upper and lower rail means, said lower rail means circumscribing said converter means, said upper and lower rail means joined in vertically spaced relation by post means to form a lattice work comprising the passage means through which the residual and replenishing liquids flow.

4. A solar still, as set forth in claim 3, in which said membrane has marginal edges, said membrane extends peripherally beyond said base frame with the marginal edge rolled inwardly and secured to said base frame upwardly of the surface on the liquid in which it is suspended to form an involute extending annularly about said base frame, said distillate accumulating in said involute.

5. A solar still, as set forth in claim 4, in which said membrane is air impervious and said involute contacts the liquid peripherally of said base frame to form an inflatable enclosure, and in which means are provided selectively to inflate said enclosure.

6. A solar still, as set forth in claim 4, in which discharge means are provided, said discharge means having an inlet portion and an outlet portion, said inlet portion communicating with said involute to receive the distillate accumulated therein and said outlet portion being accessible exteriorly of said membrane.

References Cited

UNITED STATES PATENTS

| | | | |
|---|---|---|---|
| 2,412,466 | 12/1946 | Miller | 202—234 |
| 2,820,744 | 1/1958 | Lighter | 202—234 |
| 3,390,056 | 6/1968 | Ingram | 202—234 |
| 3,367,843 | 2/1968 | Clive | 203—10 X |
| 3,397,117 | 8/1968 | Smith et al. | 203—10 X |
| 3,408,260 | 10/1968 | Feldman et al. | 203—10 X |
| 3,501,381 | 3/1970 | Delano | 203—10 X |

NORMAN YUDKOFF, Primary Examiner

D. EDWARDS, Assistant Examiner

U.S. Cl. X.R.

202—234; 203—10, 100, DIG. 1